(No Model.) 3 Sheets—Sheet 1.

J. H. BLESSING.
APPARATUS FOR FILTERING WATER.

No. 442,601. Patented Dec. 16, 1890.

Witnesses:
S. B. Brewer
Clarence Strevell

Inventor·
JAMES H. BLESSING,
by William H. Low,
Attorney.

(No Model.) 3 Sheets—Sheet 2.

J. H. BLESSING.
APPARATUS FOR FILTERING WATER.

No. 442,601. Patented Dec. 16, 1890.

Witnesses:
S. B. Brewer
Clarence Stewett

Inventor:
JAMES H. BLESSING,
by William H. Low,
Attorney (No Model.) 3 Sheets—Sheet 3.
J. H. BLESSING.
APPARATUS FOR FILTERING WATER.
No. 442,601. Patented Dec. 16, 1890.
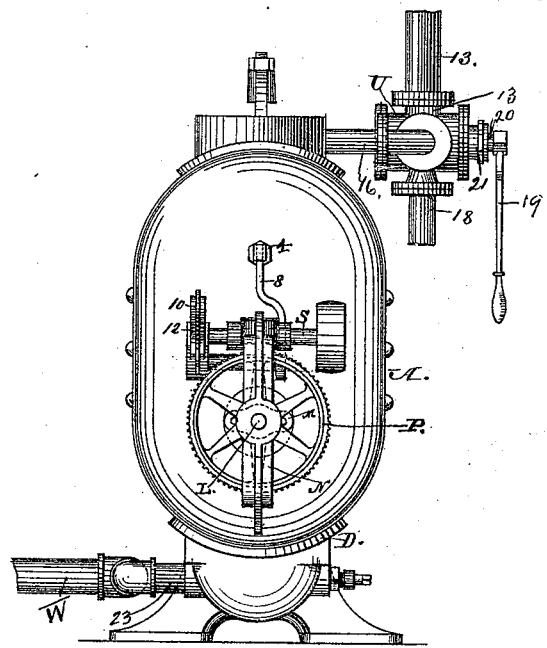
FIG. 3.
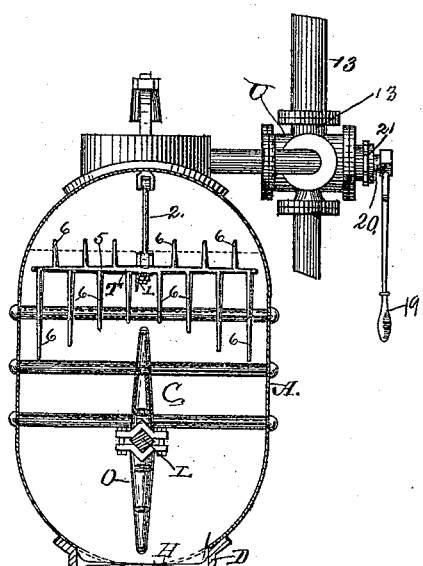
FIG. 4.
Witnesses:
Inventor:
JAMES H. BLESSING,
by William R. Low.
Attorney.

UNITED STATES PATENT OFFICE.

JAMES H. BLESSING, OF ALBANY, NEW YORK.

APPARATUS FOR FILTERING WATER.

SPECIFICATION forming part of Letters Patent No. 442,601, dated December 16, 1890.

Application filed July 24, 1890. Serial No. 359,727. (No model.)

*To all whom it may concern:*

Be it known that I, JAMES H. BLESSING, of the city and county of Albany, in the State of New York, have invented new and useful Improvements in Apparatus for Filtering Water, of which the following is a specification.

My invention relates to improvements in the class of filtering apparatus that is specially designed for filtering the water from muddy turbid streams, and in which the operation of filtration is effected by passing the water downwardly through the filtering material; and the object of my invention is to provide means for removing at frequent intervals the mud or other extraneous matter from the surface and upper stratum of the filtering material without disturbing the other portions of the latter, and to provide means for disturbing the upper stratum of the filtering material, either independently of the operation of agitating the lower stratum of said material or conjunctively therewith. This object I attain by the mechanism illustrated in the accompanying drawings, which are herein referred to and form part of this specification, and in which—

Figure 1:
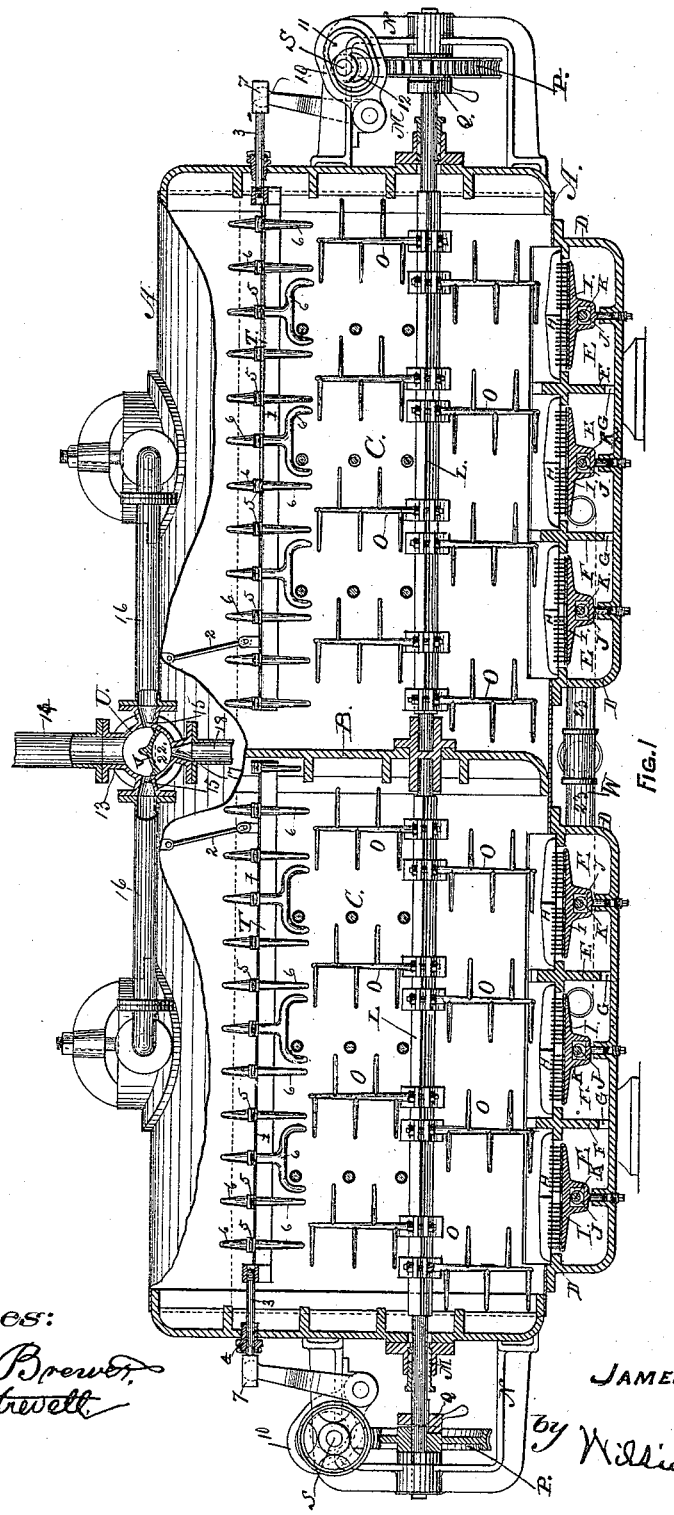
Figure 2:
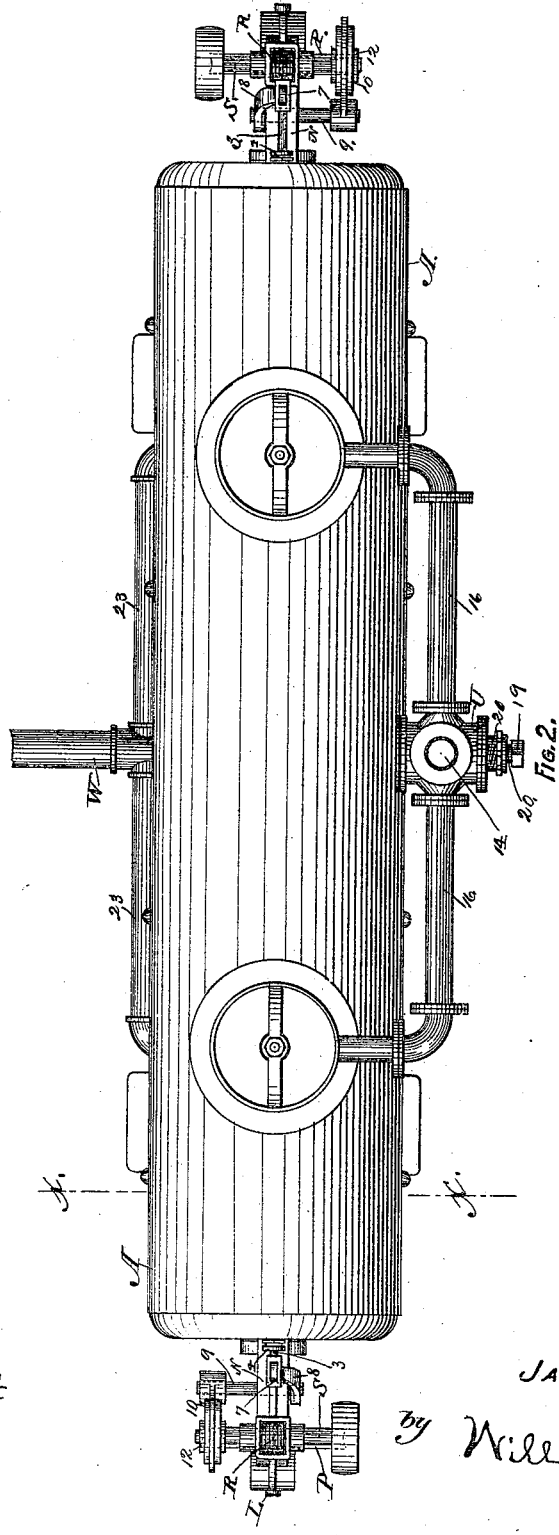

Figure 1 is a longitudinal section of my filtering apparatus, with a portion of the parts shown in side elevation. Fig. 2 is a plan view of said apparatus. Fig. 3 is an end elevation of the same, and Fig. 4 is a transverse section at the line X X of Fig. 2.

As represented in the drawings, A designates the shell or casing of my apparatus, which is usually made of sheet metal in a form which approximates an ellipse in its transverse section, the major diameter of which is arranged to stand vertically. Said casing is divided by a transverse diaphragm B into two filtering-chambers C of equal capacity, or nearly so, and said chambers are nearly filled with sharp beach-sand, or other suitable filtering material. The casing A is supported on the saddles D, containing the filtered-water chambers E, whereinto the filtered water will pass after it leaves the filtering-chambers C. Said filtered-water chambers are partially divided from each other beneath each of the filtering-chambers C, by means of transverse partitions F, each of which is provided with an opening G, whereby the filtered-water chambers in each of said saddles will have a free communication with each other. A percolating-plate H is interposed between each of said filtered-water chambers and the corresponding filtering-chamber C. Said percolating-plates are perforated, and each perforation contains a movable pin of slightly-smaller diameter than the perforation, so as to form an annular space between the bore of each perforation and its contained pin, through which the water can ooze, but which will prevent the passage of any of the filtering material therethrough. Said pins are secured to heads I, of which there is one under each of said percolating-plates, and each of said heads is fitted to receive a slight reciprocating motion in a vertical direction by means of an eccentric J, secured to a shaft K, arranged in each of the filtered-water chambers E directly beneath each of said percolating-plates. The latter and the movable pins in their perforations form no part of this invention; but they will be found fully shown and described in Letters Patent Nos. 352,943 and 352,944, granted to me November 23, 1886.

Each of the filtering-chambers C is provided with a horizontal shaft L, whose inner end is journaled in a bearing on the diaphragm B, and whose opposite end projects out from the corresponding filtering-chamber through a stuffing-box M, and is journaled in a bracket N, of which there are two secured to the opposite heads of the casing A.

Each of the shafts L is provided within the filtering-chambers C with a series of agitators O, which are arranged radially on said shafts, and by which the filtering material contained in the lower part of said filtering-chambers can be loosened and agitated for the purpose of facilitating the cleansing of said material; and for the purpose of imparting a rotary motion to said shafts a worm-wheel P is provided for the projecting end of each, and preferably each of said worm-wheels is loosely fitted to the corresponding shaft, so as to permit said wheel to be rotated independently of said shaft, and to effect this purpose each of said worm-wheels is provided with a clutch mechanism Q, which is fitted to engage with, and disengage from, said worm-wheel. An endless screw R is secured to a shaft S, journaled in the bracket N, transversely to the shaft L, and said endless screw is fitted to engage in the teeth of the corresponding worm-wheel P for the purpose of imparting a rotatory motion to the latter, and, when the clutch Q is engaged with said worm-wheel, to the shaft L. By the rotations of the latter the agitators O will effect a loosening up and disturbance of a cylindrical body of the filtering material contained in the lower part of the filtering-chamber, and thereby the remaining portion of said filtering material, which is superimposed on and integral with said cylindrical body, would remain undisturbed if suitable provision were not made, and for that purpose a horizontally-reciprocating agitator T is fitted to disturb the surface of the filtering material. Said agitator consists of a bar 1, whose inner end is suspended by a link 2 to the casing A, and whose opposite end is provided with a suitable rod 3, which extends exteriorly from the head of said casing by passing through a stuffing-box 4 provided for that purpose. A series of transverse arms 5 is secured to the rod 1 at suitable distances from each other, and each of said arms is provided with a series of vertical prongs 6, which project from the upper and lower sides thereof, those on the upper side being preferably made of a uniform height to extend through the upper surface of the filtering material and those on the lower side being preferably made of varying heights to conform to the arc of the circle described by the radial arms of the agitators O, or approximately thereto. The outer end of the rod 3 is provided with a mortised box 7 or other suitable means for forming a connection with the swinging end of an arm 8, secured to a rocker-shaft 9, journaled on the bracket N. An arm 10, provided with a slotted opening 11, is also secured to said rocker-shaft, and in said slotted opening an eccentric 12 or other suitable cam, secured to the shaft S, is fitted to engage for the purpose of imparting a rocking motion to the shaft 9, and through the latter a vibratory motion to the arm 8, whereby the required reciprocating motion is imparted to the agitator T, and it should be understood that when the clutch Q is disengaged from the worm-wheel P said agitator can be operated independently of the agitator O, or by engaging said worm-wheel to the shaft L by means of the clutch Q the agitators O and T can be operated conjunctively to produce a thorough cleansing of the entire body of the filtering material when required.

U is the water-controlling valve-casing, which is made cylindrical in form, and is provided with an inlet-nozzle 13, to which the water-supply pipe 14 is connected, oppositely-located eduction-ports 15, that communicate with corresponding water-pipes 16, which form separate connections from said valve-casing to the filtering-chamber C, and a waste-water eduction-port 17, which connects with a waste-water pipe 18, through which the contaminated water produced by the operation of cleansing the filtering material is conducted to a suitable drain, through which said waste water will be conveyed to any point of delivery. The casing U contains an oscillating valve V, to which motion can be imparted from the exterior by means of a handle 19, secured to a spindle 20, integral with said valve and projecting from the valve-casing through a stuffing-box 21. Said valve is of such length that when placed in its midway position, as shown by the full lines of Fig. 1, both of the eduction-ports 15 will be uncovered to allow the water flowing into the apparatus through the water-supply pipe 14 to pass freely into both of the filtering-chambers C; but when said valve is moved to cover either of the eduction-ports 15, one of such positions being indicated by dotted lines in Fig. 1, the pass-over passage 22 of said valve will form an open communication between the covered eduction-port 15 and the waste-water eduction-port 17. The opposite eduction-port 15 will be uncovered to allow the incoming water to flow into the filtering-chamber C, with which said uncovered port communicates.

W is an outlet-pipe through which the filtered water from the apparatus is conveyed to the required points. Said outlet-pipe is connected by branch pipes 23 to the saddles D, so as to form a communication from one set of filtered-water chambers E to the other set of said chambers.

In the waters of some of the rivers of this country, notably the water of the Mississippi and its tributaries, a considerable quantity of mud and muddy impurities are held in a state of suspension, and when this water is subjected to the process of filtration said impurities will, if the process of filtration is effectively performed, be deposited in the filtering apparatus, and when the process of filtration is effected by passing the water downwardly through the filtering material said impurities will be mainly lodged upon or near the upper surface of the filtering material and will only penetrate into the lower stratum of said material by a continuous operation of filtration for several hours, so that the necessity for disturbing this lower stratum as frequently as the upper portion of said filtering material for the purpose of cleansing the same will not arise, and for that reason by providing means for agitating the upper stratum of the filtering material independently of the lower stratum the operation of cleansing said material is greatly facilitated. The washing of the entire body of said filtering material in a filtering-chamber is effected every time the direction of the flow of water is changed to pass upwardly.

The operation of filtering by this apparatus is fully described in the Letters Patent hereinbefore referred to.

The operation of cleansing the filtering material is performed in the following manner:

The valve V is moved to close over the port 15, which communicates with the chamber C, whose filtering material is to be cleansed, and thereby communication is established, through the pass-over passage 22, between said chamber and the waste-water pipe 17, so that filtered water from the opposite filtering-chamber will flow upwardly through the filtering-chamber whose filtering material is to be cleansed. This upward flow of water through the filtering material causes the particles of the latter to be loosened up and partially separated from each other, and it should be understood that this condition will obtain whether the entire body of the filtering material or only the upper stratum of the same is to be cleansed, and thereby the resistance to the movements of the agitators will be greatly lessened. A rotatory motion is imparted to the shaft S, which pertains to the chamber C, whose filtering material is to be cleansed, and thereby a reciprocating motion will be imparted to the agitator T in said chamber, whereby the upper stratum of the filtering material will be disturbed and agitated to a degree sufficient to effect a dislodgment of the impurities from the loosened particles of said material, so that said impurities can be carried out of said chamber by the current of outflowing water passing through the waste-pipe 18. When the lower stratum of the filtering material is to be cleansed, which operation is performed conjunctively with the cleansing of the upper stratum of said material, the clutch Q is engaged with the worm-wheel P pertaining thereto so as to produce a rotatory motion of the corresponding shaft L, and thereby effecting a rotatory movement of the agitators O, which will disturb and separate the particles of the filtering material contained in the lower portion of a filtering-chamber.

What I claim as my invention, and desire to secure by Letters Patent, is—

1. In a horizontal filtering apparatus, the combination of a rotative agitator having a horizontal axis, said agitator being fitted to disturb and separate the particles of the lower stratum of filtering material, and a horizontally-reciprocating agitator which is arranged directly over said rotative agitator and is fitted to loosen and disturb the particles of the upper stratum of said filtering material, as and for the purpose herein specified.

2. In a horizontal filtering apparatus, the combination of a rotative agitator having a clutch mechanism whereby the shaft of said agitator can be connected with and disconnected from the gearing by which said agitator is rotated, a horizontally-reciprocating agitator fixed directly over said rotative agitator, and mechanism whereby a reciprocating motion can be imparted to said reciprocating agitator either conjunctively with or independently of said rotative agitator, as and for the purpose herein specified.

JAMES H. BLESSING.

Witnesses:
WM. F. WHEELOCK,
WM. H. LOW.